United States Patent
Gillet

(10) Patent No.: US 9,403,289 B2
(45) Date of Patent: Aug. 2, 2016

(54) DIAMOND TOOL AND METHOD OF MAKING THIS TOOL

(75) Inventor: Thierry Gillet, Brussels (BE)

(73) Assignee: HUSQVARNA AB, Huskvarna (SE)

( * ) Notice: Subject to any disclaimer, the term of this patent is extended or adjusted under 35 U.S.C. 154(b) by 1149 days.

(21) Appl. No.: 13/384,549

(22) PCT Filed: Jul. 17, 2009

(86) PCT No.: PCT/SE2009/000372
§ 371 (c)(1),
(2), (4) Date: Apr. 6, 2012

(87) PCT Pub. No.: WO2011/005153
PCT Pub. Date: Jan. 31, 2011

(65) Prior Publication Data
US 2012/0186162 A1   Jul. 26, 2012

(51) Int. Cl.
  B24D 3/00     (2006.01)
  B24D 3/02     (2006.01)
  B24D 11/00    (2006.01)
  B24D 18/00    (2006.01)
  C09K 3/14     (2006.01)
  B28D 1/04     (2006.01)

(52) U.S. Cl.
  CPC ..................... B28D 1/041 (2013.01)

(58) Field of Classification Search
  USPC ........................... 51/309, 293, 307
  See application file for complete search history.

(56) References Cited

U.S. PATENT DOCUMENTS

| 4,448,590 A * | 5/1984 | Wray ............... B24D 13/04 51/293 |
| 4,641,628 A * | 2/1987 | deKok ............. B23D 61/06 125/15 |
| 6,571,889 B2 * | 6/2003 | Griffo ............. B22F 7/06 175/371 |
| 2004/0094333 A1 * | 5/2004 | Yamamoto ........ B22F 7/06 175/426 |

FOREIGN PATENT DOCUMENTS

| CN | 1718407 A | 1/2006 |
| CN | 2918018 Y | 7/2007 |

(Continued)

OTHER PUBLICATIONS

International Search Report, International Application PCT/SE2009/000372, mailed Apr. 8, 2010, pp. 1-5.

(Continued)

*Primary Examiner* — James McDonough
(74) *Attorney, Agent, or Firm* — Nelson Mullins Riley & Scarborough LLP

(57) ABSTRACT

The invention relates to a diamond tool comprising a tool body (1, 2, 3) provided with diamond segments (4) manufactured by sintering and each segment comprising at least one diamond part (5) and a base part (6), or base (6), which base (6) is fixed to the tool body (1, 2, 3), so that the diamond part protrudes from a cutting edge (10) of the tool body in a protruding direction. More specifically a number of notches (7) are arranged to cross through the cutting edge (10) in a lateral direction compared to the protruding direction, and at least one, and preferably all, of the diamond segments (4) are fixed to the tool body (1, 2, 3) through attachment of the base (6) of the diamond segment to at least one notch (7) by fixing methods comprising a base deforming force applied in a lateral direction to the base (6), compared to the protruding direction.

14 Claims, 2 Drawing Sheets

(56) References Cited

FOREIGN PATENT DOCUMENTS

| | | | | |
|---|---|---|---|---|
| CN | 200948651 Y | 9/2007 | | |
| CN | 201002311 Y | 1/2008 | | |
| DE | 2038608 A | 2/1972 | | |
| DE | 2730912 A1 * | 1/1979 | ............. | B23D 61/04 |
| EP | 0356923 A1 | 3/1990 | | |
| EP | 1690634 A2 | 8/2006 | | |
| FR | 2705600 A1 | 12/1994 | | |
| JP | S5894914 A | 6/1983 | | |
| JP | S6062467 A | 4/1985 | | |
| JP | 02269570 A * | 11/1990 | | |
| JP | H3100017 U | 10/1991 | | |
| JP | 2001310264 A | 11/2001 | | |
| JP | 2003086233 A | 3/2003 | | |

OTHER PUBLICATIONS

Written Opinion, International Application PCT/SE2009/000372, mailed Apr. 8, 2010, pp. 1-5.

International Preliminary Report on Patentability, International Application PCT/SE2009/000372, mailed Nov. 17, 2011, pp. 1-6.

* cited by examiner

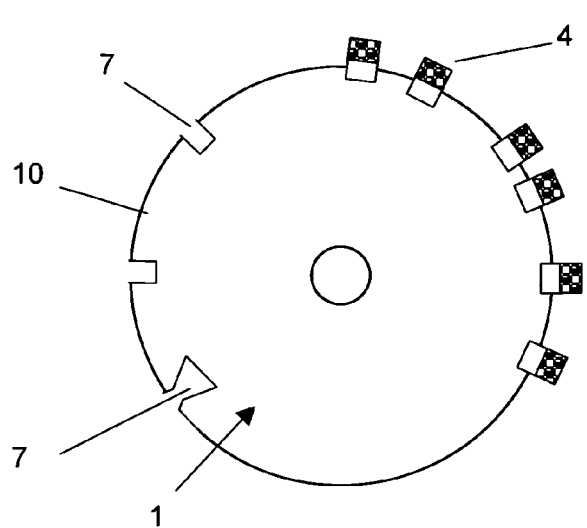 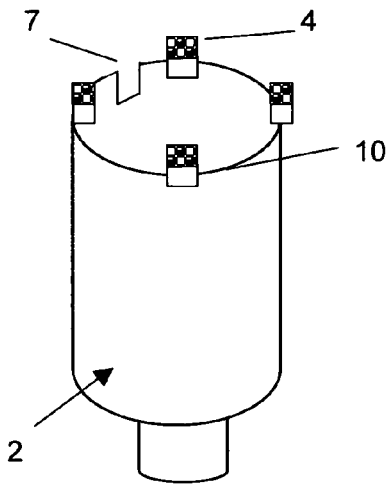
Fig. 1    Fig. 2
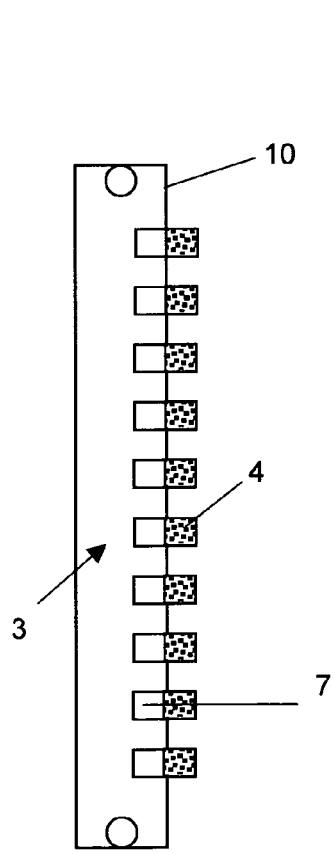 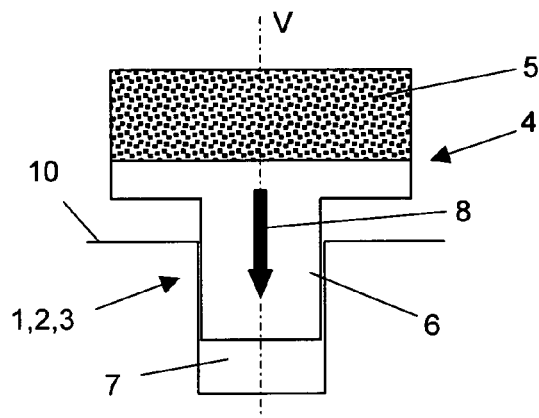 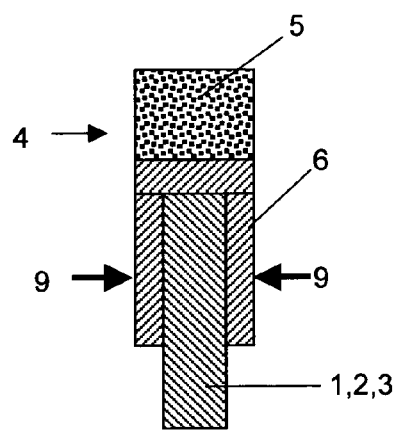
Fig. 3    Fig. 4    Fig. 5

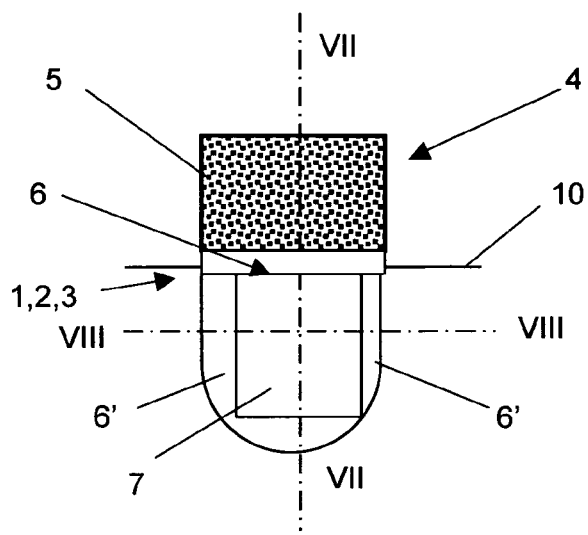
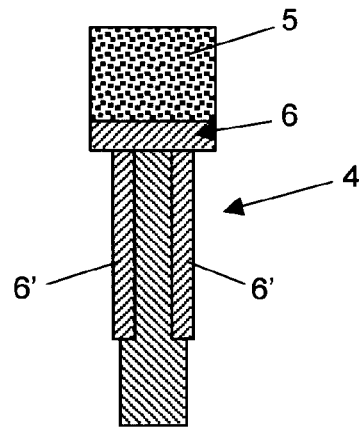
Fig. 6
Fig. 7
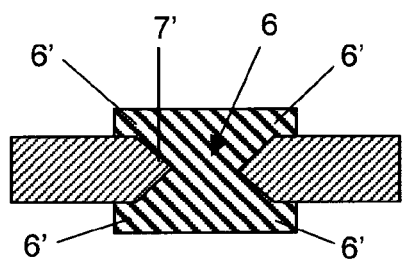
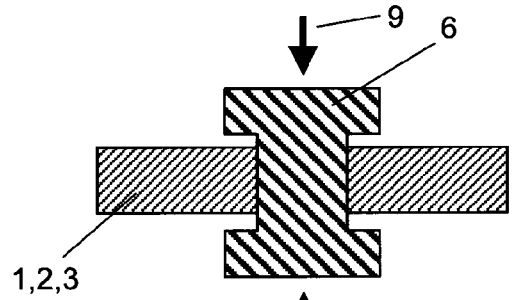
Fig. 8
Fig. 9
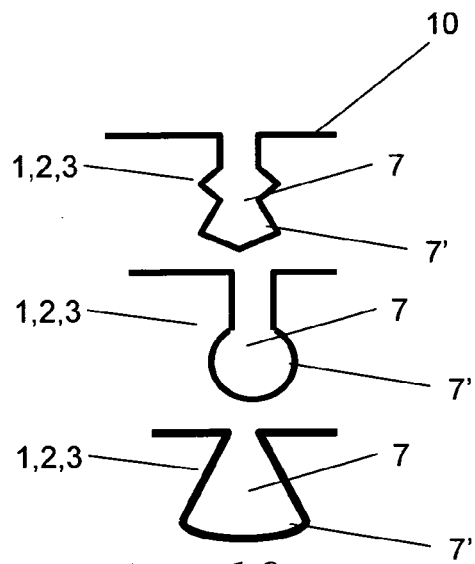
Fig. 10

DIAMOND TOOL AND METHOD OF MAKING THIS TOOL

TECHNICAL FIELD

This invention relates to a diamond tool comprising a tool body provided with diamond segments manufactured by sintering and each segment comprising at least one diamond part and a base part, or base, which base is fixed to the tool body, so that the diamond part protrudes from a cutting edge of the tool body in a protruding direction.

TECHNICAL BACKGROUND

It is known that diamond circular saw blades and drilling or grinding tools for building materials or natural stone materials, are formed by a steel substrate, or tool body, fixed to a rotating spindle of a sawing or drilling machine and diamond segments mounted on the periphery or at the end of this substrate by brazing or welding. The same thing applies to gang saw blades.

Fastening these segments by thermal processes such as brazing and welding necessarily involves an increase in temperature, as a result of which it is often necessary to provide interruptions in the steel substrate periphery, referred to as notches, or to modify the distortion of the substrate caused by the heating. It is well known that a situation of this kind also makes it necessary to restore sufficient tension to the substrate by hammering or roller compression so as to modify the length of the steel fibres of this substrate.

As a result of the fact that the diamond elements are brazed or welded to the substrate, there is a risk that those diamond elements or segments will be damaged during this operation necessarily involving the heating thereof.

These operations are very labour-intensive and consequently very expensive.

In addition, it is known that the cutting capacity of these tools is directly proportional to the number and dimensions of the diamond segments mounted thereon. Each requirement with respect to service life and with respect to cutting speed will necessitate a different geometry of the periphery of the substrate, thereby considerably increasing the number of substrates, or tool bodies, to be provided for the assembly of the tools, e.g. as a function of the materials to be sawn.

SUMMARY OF THE INVENTION

One of the essential aims of this invention is to obviate these considerable disadvantages and therefore to solve the problems encountered with known diamond tools in a simple manner, without any particular technical knowledge being required.

To this end, according to the invention, a number of notches are arranged to cross through the cutting edge in a lateral direction compared to the protruding direction, and at least one, and preferably all, of the diamond segments are fixed to the tool body through attachment of the base of the diamond segment to at least one notch by fixing methods comprising a base deforming force applied in a lateral direction to the base, compared to the protruding direction. This means that two lateral sides of the base can be pressed at to give a deformation of the base making it expand in other directions and fill the notch. This creates an attachment of the base to the notch and tool body without using a third part like a rivet and without using strong heat for brazing or welding, which is a big advantage.

Further, according to the invention, each of the diamond segments of the tool comprises a workable, and preferably cold-workable, base fixed to the latter. Possibly a gentle heating of the base could be used to make it more workable.

The aforesaid base is advantageously produced by powder metallurgy.

More particularly, the aforesaid powders comprise at least one of the metals selected from the group formed by copper, substantially pure iron, low-carbon steel, stainless steel, nickel and alloys of these metals workable, and preferably cold-workable after sintering.

According to a particularly advantageous embodiment, at least lateral edges of the notch are bevelled.

The invention also relates to a method of producing this tool.

This method is characterised in that the diamond segments are fixed to the tool body of the tool by the known techniques of riveting, pressing or crimping.

BRIEF DESCRIPTION OF THE DRAWINGS

Other details and features of the invention will be clear from the following description of several particular embodiments of the invention given by way of non-limiting examples and with reference to the accompanying drawings.

FIG. 1 is a diagrammatic side view of a circular saw blade provided with diamond segments attached according to the invention, and also showing three open notches.

FIG. 2 is a diagrammatic perspective view of a drilling tool provided with diamond segments attached according to the invention, and showing an open notch.

FIG. 3 is a view analogous to that of FIG. 1 of a gang saw blade or reciprocating blade, provided with diamond segments attached according to the invention.

FIG. 4 is a diagrammatic side view of a diamond segment as it is engaged in a tool body of a first embodiment.

FIG. 5 is a cross section along the line V-V of FIG. 4.

FIG. 6 is a side view analogous to that of FIG. 4 of a diamond segment fixed to the said tool body of a second embodiment by riveting, pressing or crimping.

FIG. 7 is a section along the line VII-VII of FIG. 6.

FIG. 8 is a section along the line VIII-VIII of FIG. 6.

FIG. 9 is a section analogous to that of FIG. 8 of a third embodiment.

FIG. 10 shows several embodiments of notches provided in the tool body according to the invention in diagrammatic form.

DETAILED DESCRIPTION OF THE PREFERRED EMBODIMENTS

Identical or analogous elements are designated by identical reference numerals in the various figures.

The invention relates generally, to a diamond tool comprising a metal substrate or tool body 1 made, e.g. of hardened steel, on which a series of diamond segments 4 are mounted. The tool body could also be made of a metal, as iron, or possibly of a composite material including e.g. epoxy resin.

The particular feature of the invention consists in that these segments 4 comprise a cold-workable base 6 fixed to the tool body 1, in particular by mechanical crimping.

FIGS. 1 to 3 show three embodiments of a tool body with several diamond segments according to the invention.

FIG. 1 thus shows a tool body provided with a few diamond segments and a few open notches, i.e. a partly finished circular saw blade, FIG. 2 shows a drilling tool with tool body 2 and FIG. 3 shows a reciprocating saw blade with tool body 3 to which a series of diamond segments 4 are fixed. Only a few segments have been shown in FIG. 1, but it will be clear that segments 4 of this kind are distributed around the entire periphery of the disc 1 in a finished circular saw blade.

The first embodiment shown in FIGS. 4 to 5 shows a segment 4 comprising a diamond part 5 mounted on a base 6.

Both the diamond part 5 and the base 6 are obtained in a conventional manner by powder metallurgy, i.e. powder sintering.

The metal powders are mixed with diamond grains before then being cold-pressed and then hot-pressed in order to undergo strengthening treatment by sintering. The selection of the composition of the metal powders and of the diamond is a direct function of the conditions of use of the finished tools: size of the tool, power and running speed of the machine, hardness and abrasiveness of the material to be cut or drilled, efficiency and cutting speed requirements. As a result, a wide range of compositions are commercially available.

For a conventional, or prior art design, it is acknowledged in order to facilitate the fixing of the segments 4 to a tool body 1 forming a disc, forming a drilling tool 2 and a blade 3, the base 6 of metal powders is preferably formed at the same time as the diamond part 5, by the same method as this diamond part. This base 6 can then be radius machined before being mounted on the tool body 1, 2 or 3. The materials from which the base 6 is formed are selected in accordance with the brazing or welding process by means of which the diamond segment is fixed to the steel body in order thereby to obtain an assembly displaying optimum mechanical resistance, e.g. to the tearing forces to which the segment 4 is to be subjected during the use of the disc 1, drilling tool 2 and blade 3.

This invention relates to a diamond tool having a tool body 1, 2, 3 as shown, e.g. in FIGS. 1 to 9, in which the base 6 of the diamond segments 4 is workable and is fixed by pressure, such as compression, uniaxial riveting, rotary riveting, etc., to this tool body, contrary to known tools in which the diamond segments 4 are brazed or welded to the latter.

The base 6 is designed in such a manner that it can be housed in cavities, such as notches 7, as shown in FIG. 4, provided on the cutting edge 10 of the tool body for a disc 1 and blade 3, and on the cutting edge 10 of the tool body 2 forming the drilling tool. The base could also be divided into two parts attaching to one notch each, or one part attaching to two notches. However these are still defined as one base. Further one base 6 could have two, or possibly more, diamond parts 5.

FIGS. 4 and 5 show a base 6 engaged in a tool 1, 2, 3 before cold-working, while FIGS. 6 to 8 show this base 6 after cold-working.

More particularly, these FIGS. 6 to 8 show the parts 6' of the worked base 6 projecting laterally relative to the notch 7, on either side of the latter. Firm, permanent attachment is obtained by virtue of these projecting parts 6', which are pressed against the two opposing faces of the tools bodies 1-3.

FIG. 8 shows a detail according to which lateral edges 7' of the notch 7 engaged with the worked base 6 are bevelled so as to improve the fixing of the base in this notch 7 and to increase the lateral and peripheral holding strength at least similar to that obtained by brazing processes.

Bevelled lateral edges 7' are useful above all where the thickness of the base is relatively small and is, e.g. approximately the same as that of the tool body 1, 2, 3.

In FIGS. 4 and 5, the base 6 has a rectangular cross section before cold-working.

FIG. 9 relates to an embodiment in which the base 6 already has an interlocking profile similar to the cold-worked shape of FIG. 8 before cold-work. This may have the advantage of reducing cold-working of the base 6 during the crimping operation.

As the assembly operation takes place in the cold state, i.e. without an increase in temperature, there is no hot working and the tool body 1, 2 and 3 can thus be pretensioned to the correct final value in advance in the factory.

The cutting edge 10 of the tool body 1, 2, 3 is advantageously provided with a maximum number of notches 7, so that diamond segments 4 do not necessarily have to be provided in all of these notches 7, but may be a function of the desired cutting application.

Consequently, given that the segments 4 are mounted on the tools independently from one another, different types of segments can therefore be provided on one single tool. The same thing applies to the spacing between two consecutive segments and the number of segments mounted on the tool body.

Advantageously the fact that the notches 7 can be filled with a ductile material such as copper means that the sawing noise can be partially absorbed.

The notches 7 are normally evenly distributed in the edge 10 of the tool. The number of notches in which a diamond segment is mounted depends on the intended application. The amount of the total space available on the free edge formed by the periphery or the end 10 of the tool covered by the diamond segments 4 is referred to as the "active surface" of the tool. The usual active surface values are spaced between 50 and 100%. Low values generally correspond to high cutting speed guidelines or to low-power machines and high values correspond to high service life guidelines or to high-power machines. The invention consequently provides that the assembly may comprise various numbers of segments of different types and of different dimensions.

The bases 6 not provided with diamonds must simultaneously be sufficiently ductile to be cold-worked during assembly and sufficiently resistant to the tearing forces caused by the cutting.

Powder metallurgy offers raw materials capable of meeting these criteria, provided that the parameters for forming the diamond segments are adapted correctly to this end. It will be noted that several metal powders are capable of satisfying this end: copper powder is the most appropriate, but pure iron powder, low-carbon steel powder, stainless steel powder, nickel or copper-nickel alloy powder, as well as any mixtures of these powders may also be considered provided that they are workable after sintering and have sufficiently high yield strength and tensile strength values after working to resist mechanical tearing, either naturally or as a result of the working itself. Cold working is normal preferred. In general, a crystal structure of the FCC (Face-Centred Cubic) type, even partial, is desirable or advantageous.

FIG. 10 shows different embodiments of notches 7 allowing the contact surface with the base 6 to be increased, thereby resulting in better attachment of the latter in the tools 1, 2 and 3.

One base can also attach to two, or possibly more, neighbouring notches 7. these notches can also be located so close to each other that they even have a common part located lower than the cutting edge 10 of the tool body 1, 2, 3.

If it is necessary to increase the holding strength of the diamond segments 4 even further for very high-stress applications, the invention allows the contacting surfaces to be glued before the base 6 is inserted into the notch 7.

It is also possible according to the invention to provide a fine layer of a material having sound-absorbing properties in the notch 7 between the tool 1, 2, 3 and the base 6. This material is, e.g. a viscoelastic polymer.

It is known that, when cutting highly abrasive materials, premature wear of the projecting parts may occur at the substrate of the tool. As the materials selected to produce the base are soft as a result of the fact that they must be workable, their abrasion resistance will be reduced de facto. In order to mitigate this problem, this abrasion resistance can be increased by adding small amount of carbides or even of diamond grains to the initial metal powders of the base part.

Although these diamond grains can be distributed throughout the entire mass of the base 6, it is therefore important above all that they are present in the vicinity of the outer surface of the latter.

Finally, when the diamond segments have been utilised completely, the invention allows the tool body to be re-covered in a very simple manner with new segments. This can be done more times than for the conventional tool bodies subjected to several heating operations by brazing and consequently damaged by successive heat treatment operations. In order to re-cover the tool body of the invention with new segments, the base 6 of the used segments simply has to be pre-drilled and pressed mechanically out of the notch 7.

EXAMPLE 1

In order to form a diamond segment for sawing reinforced concrete walls, cobalt powders were mixed with bronze powders and subjected to sintering at a temperature of 750 to 850° C. at a pressure of 300 to 400 kg/cm² for a period of 3 to 5 minutes in a graphite mould. These sintering conditions gave the base with the same powder components the properties required for it to be cold-worked at a minimum pressure of 25 kg/mm² and a maximum pressure of 100 kg/mm².

This base had a height of 10 mm, a thickness of 5 mm and a width of 8 mm. The notch in which it was inserted had the same height and the same width, but a thickness of 4 mm. In addition, the edges of this notch were bevelled at 45°.

The base was then cold-worked into the notch according to the same principles as a rivet, except that the notch left one side open.

EXAMPLE 2

An interlocking base as shown in FIG. 9 having initial dimensions before crimping of a thickness of 5 mm and a width of 5 mm was introduced into a notch having a width of 2.5 mm and a depth of 10 mm. This base was obtained from copper powders sintered at 800° C. at a pressure of 350 kg/mm².

A notch having the shape of the first embodiment shown in FIG. 10 was formed in a disc of hardened steel with a hardness of 35 HRC having a diameter of 330 mm and a thickness of 2.5 mm, so that the side parts of the base each had a thickness of 1.25 mm before working.

The crimping was carried out by press forming with a force of 2.5 tonnes so as to obtain a thickness projecting with respect to the disc of close to 0.75 mm.

The holding strength of this interlocking engagement was measured statically at more than 60 kg/mm², this being in accordance with the safety regulations in force.

It will be clear that the invention is not limited to the embodiments described hereinabove and illustrated in the accompanying figures, but that other variants may be envisaged without going beyond the scope of this invention.

Any technique allowing the base to be fixed by working, preferably cold working, in a notch provided in a sawing, drilling or grinding tool may thus be used, and the shape of the notch and equally of the base and the diamond part may vary to a considerable extent.

The invention claimed is:

1. A diamond tool comprising:
   a tool body provided with diamond segments manufactured by sintering and at least one of the diamond segments comprise
      at least one diamond part and a base part, or base, which base is fixed to the tool body, so that the diamond part protrudes from a cutting edge of the tool body in a protruding direction,
      said base is made of a material formed by powder sintering to form the required shape essentially without machining and a number of notches are arranged to cross through the cutting edge in a lateral direction compared to the protruding direction, and
      at least one of the diamond segments are fixed to the tool body through attachment of the base of the diamond segment to at least one notch by fixing methods comprising a base deforming force applied in a lateral direction to the base, compared to the protruding direction, thus giving a lateral deformation of the base making it expand in other directions and fill the notch.

2. The tool according to claim 1, wherein the fixing methods comprise working or press forming.

3. The tool according to claim 1, wherein the said base is made of a material formed by powder sintering using the same sintering conditions as used for sintering the diamond part.

4. The tool according to claim 3, wherein the said base and the said diamond part are sintered simultaneously.

5. The tool according to claim 3, wherein the powders comprise at least one of the metals selected from the group: copper, substantially pure iron, low-carbon steel, stainless steel, nickel and alloys of these metals workable after sintering.

6. The tool according to claim 1, wherein a mark or a logo is stamped on at least one of the faces of the base.

7. The tool according to claim 1, wherein the base comprises at least in the vicinity of its outer surface diamond grains distributed in the metal from which the base is formed.

8. The tool according to claim 1, wherein it comprises in the cutting edge of the tool body evenly distributed notches without a diamond segment.

9. The tool according to claim 1, wherein the base has a length in the protruding direction of 0.5 to 3 times the length of the diamond part in the protruding direction.

10. The tool according to claim 9, wherein the base has a length in the protruding direction of 1 to 3 times the length of the diamond part in the protruding direction.

11. The diamond tool of claim 1,
   wherein glue is provided between the base fixed in the tool body and the part of the latter in contact with the base.

12. The diamond tool of claim 1,
   a tool body provided with diamond segments manufactured by sintering and at least one of the diamond segments comprise
      wherein a material having sound-absorbing properties is provided between the base fixed in the tool body and the part of the latter in contact with the base.

13. The diamond tool of claim 1,
   wherein the base is attached to at least two notches.

14. The diamond tool of claim 1, wherein at least lateral edges of the notch are bevelled, such that the notch is narrower at an opening end configured to receive the base than at a terminal end opposing the opening end.

* * * * *